United States Patent
Liu et al.

(10) Patent No.: US 11,420,602 B2
(45) Date of Patent: Aug. 23, 2022

(54) RAIL TRAIN BRAKE CONTROL SYSTEM AND TRAIN

(71) Applicant: CRRC TANGSHAN CO., LTD., Hebei (CN)

(72) Inventors: Zhonghua Liu, Tangshan (CN); Lei Chen, Tangshan (CN); Chunjie Xie, Tangshan (CN); Hongmei Xu, Tangshan (CN); Bo Zhou, Tangshan (CN); Keyu Cao, Tangshan (CN); Peilei Fang, Tangshan (CN); Qingdong Meng, Tangshan (CN); Zhenshan Ji, Tangshan (CN); Shan Gao, Tangshan (CN); Liyun Shao, Tangshan (CN)

(73) Assignee: CRRC TANGSHAN CO., LTD., Hebei (CN)

( * ) Notice: Subject to any disclaimer, the term of this patent is extended or adjusted under 35 U.S.C. 154(b) by 484 days.

(21) Appl. No.: 16/627,327

(22) PCT Filed: Jun. 29, 2018

(86) PCT No.: PCT/CN2018/093605
§ 371 (c)(1),
(2) Date: Dec. 29, 2019

(87) PCT Pub. No.: WO2019/095699
PCT Pub. Date: May 23, 2019

(65) Prior Publication Data
US 2020/0156604 A1    May 21, 2020

(30) Foreign Application Priority Data

Nov. 17, 2017    (CN) .......................... 201711147614.2

(51) Int. Cl.
*B60T 8/17* (2006.01)
*B60T 7/12* (2006.01)
(Continued)

(52) U.S. Cl.
CPC ............ *B60T 8/1705* (2013.01); *B60T 7/128* (2013.01); *B60T 8/171* (2013.01); *B60T 8/176* (2013.01);
(Continued)

(58) Field of Classification Search
None
See application file for complete search history.

(56) References Cited

U.S. PATENT DOCUMENTS 9,764,745 B2    9/2017  Tsuzaka
2014/0345491 A1  11/2014  Scharpf et al.
(Continued)

FOREIGN PATENT DOCUMENTS

CA    2347772 A1 *  5/2000
CN   102114858 A    7/2011
(Continued)

OTHER PUBLICATIONS

Supplementary European Search Report in the European application No. 18879098.4, dated Oct. 12, 2020.
(Continued)

*Primary Examiner* — Melanie Torres Williams
(74) *Attorney, Agent, or Firm* — Syncoda LLC; Feng Ma (57) ABSTRACT

A rail train brake control system, comprising: a single vehicle brake control unit, a train brake control unit, a traction control unit and a communication control unit; the single vehicle brake control unit is provided in each vehicle of the rail train, the train brake control unit and the communication control unit are provided in the vehicles at both ends of the rail train, and the traction control unit is disposed in motor vehicles of a plurality of vehicles; and the single vehicle brake control unit, the train brake control unit, the traction control unit and the communication control unit implement communication by means of the gateway. The (Continued)

system can realize flexible marshalling of a train. Further disclosed is a train comprising the train brake control system.

20 Claims, 2 Drawing Sheets

(51) Int. Cl.
*B60T 8/171* (2006.01)
*B60T 8/176* (2006.01)
*B60T 8/18* (2006.01)
*B60T 8/32* (2006.01)
*B61H 11/14* (2006.01)
*B61L 15/00* (2006.01)

(52) U.S. Cl.
CPC .......... *B60T 8/1893* (2013.01); *B60T 8/3235* (2013.01); *B61H 11/14* (2013.01); *B61L 15/0036* (2013.01); *B60T 2220/00* (2013.01); *B60T 2250/02* (2013.01); *B60T 2250/04* (2013.01); *B60T 2270/10* (2013.01); *B60T 2270/40* (2013.01); *B60T 2270/60* (2013.01)

(56) References Cited

U.S. PATENT DOCUMENTS

| | | |
|---|---|---|
| 2015/0032302 A1 | 1/2015 | Foerster et al. |
| 2016/0176419 A1 | 6/2016 | Tsuzaka |

FOREIGN PATENT DOCUMENTS

| | | | |
|---|---|---|---|
| CN | 102602386 A | | 7/2012 |
| CN | 103625505 A | | 3/2014 |
| CN | 104071143 A | | 10/2014 |
| CN | 102991536 B | | 11/2015 |
| CN | 105346556 A | | 2/2016 |
| CN | 105438222 A | | 3/2016 |
| CN | 105452049 A | | 3/2016 |
| CN | 105620448 A * | | 6/2016 |
| CN | 105791071 A * | 7/2016 | .......... B61L 15/0027 |
| CN | 105923018 A * | 9/2016 | ............. B61C 17/12 |
| CN | 106240601 A * | 12/2016 | .......... B61L 15/0036 |
| CN | 106335519 A | | 1/2017 |
| DE | 19738629 A1 | | 3/1999 |
| EP | 1306283 A2 | | 5/2003 |
| EP | 2476573 A2 | | 7/2012 |
| EP | 3179674 A1 | | 6/2017 |
| JP | 2005341784 A | | 12/2005 |
| KR | 20010085141 A | | 9/2001 |
| WO | 2004054840 A1 | | 7/2004 |
| WO | 2014190003 A1 | | 11/2014 |

OTHER PUBLICATIONS

International Search Report in the international application No. PCT/CN2018/093605, dated Aug. 31, 2018.
English translation of the Written Opinion of the International Search Authority in the international application No. PCT/CN2018/093605, dated Aug. 31, 2018.

* cited by examiner

RAIL TRAIN BRAKE CONTROL SYSTEM AND TRAIN

CROSS-REFERENCE TO RELATED APPLICATIONS

This application is a 35 U.S.C. 371 national stage filing of International Application No. PCT/CN2018/093605 filed Jun. 29, 2018, which claims priority to Chinese Patent Application No. 201711147614.2 filed Nov. 17, 2017. The entire contents of these above patent applications are hereby incorporated by reference in their entirety.

TECHNICAL FIELD

The present application relates to the field of rail transit, in particular to a brake control system of a rail train and a train.

BACKGROUND

At present, the traditional passenger train transmits a brake control signal through a pressure change of a train pipe, and the vehicles of the train can be flexibly marshaled by means of the train pipe running through the whole train. All of the high-speed trains are in form of fixed formation, namely 8-vehicle formation and 16-vehicle formation, and the vehicles of the train cannot be flexibly marshaled.

With the development of passenger transport diversification, the high-speed trains develop in the direction of flexible formation gradually, so as to adapt to the diversified passenger flows and maintenance trends. But the requirement for a brake control also comes along with the realization of flexible formation. For example, the existing fixed formation mode has determined the structure of a braking device and a control method of a braking force, and a control process of the braking force is also calculating and distributing the braking force according to the fixed train formation mode. After the number is changed, a system cannot operate normally, and then the flexible formation cannot be realized. Besides, the braking of the traditional passenger train is realized by means of the train pipe running through the whole train and a three-way valve; specifically, pressure reduction of the train pipe applies the braking, and pressure boost of the train pipe releases the braking. The traditional passenger train merely transfers an air braking instruction through the train pipe, and cannot perform more advanced control on the braking force.

SUMMARY

In view of this, embodiments of the present application are intended to provide a brake control system of a rail train.

To this end, a technical solution of the embodiments of the present application is implemented as follows.

A rail train includes multiple vehicles, and the multiple vehicles include a power vehicle and a non-power vehicle. The system includes: a vehicle brake control unit, a train brake control unit, a traction control unit, and a communication control unit. Each vehicle of a rail train is provided with the vehicle brake control unit. Each of the vehicles located at both ends of the rail train is provided with the train brake control unit and the communication control unit. Each of the power vehicles of the multiple vehicles is provided with the traction control unit. The vehicle brake control unit, the train brake control unit, the traction control unit and the communication control unit perform communication by means of gateways.

The train brake control unit is configured to calculate, according to braking information sent by the vehicle brake control unit and the traction control unit, data of air braking force and an electric braking force to be applied.

The vehicle brake control unit is configured to perform air braking on the train according to the data of the air braking force to be applied which is sent by the train brake control unit.

The traction control unit is configured to perform electric braking on the train according to the data of the electric braking force to be applied which is sent by the train brake control unit.

The communication control unit is configured to receive a braking instruction from a driver controller, and send the braking instruction to a system where the instruction is executed.

In some examples, each vehicle is provided with a multifunction vehicle bus. Each of the vehicle brake control unit, the train brake control unit, the traction control unit and the communication control unit is connected to the multifunction vehicle bus. The multifunction vehicle bus is connected to the gateway. The gateways between the multiple vehicles are connected to one another by means of a wired train bus.

In some examples, the train brake control unit includes a primary unit and an auxiliary unit. The primary unit is the train brake control unit which is provided on the vehicle at one end of the rail train where the driver is located. The auxiliary unit is the train brake control unit which is provided on the vehicle at the other end of the train. The primary unit and the auxiliary unit are connected to one another by means of the gateway. When the primary unit malfunctions, the auxiliary unit is upgraded to service as the primary unit.

In some examples, the train brake control unit is further configured to:

receive the braking instruction from the communication control unit sent by the driver controller, wherein the braking instruction at least comprises a brake grade;

receive weight information of each vehicle sent by each vehicle brake control unit, calculate and latch the total weight of the train according to the weight information of each vehicle, and update the total weight of the train each time when the train starts;

receive and record speed information sent by each vehicle brake control unit, and send a record result to the communication control unit;

receive an actual speed of the train which is calculated by the communication control unit according to the record result;

acquire a current braking acceleration of the train according to the brake grade and the actual speed of the train, and acquire data of total braking force for the train according to the total weight of the train and the current braking acceleration of the train;

receive data of maximum available electric braking force for single vehicle sent by the vehicle brake control unit provided on each power vehicle, and calculate data of total maximum available electric braking force for the train according to the data of maximum available electric braking force for single vehicle;

calculate, according to the data of total braking force for the train and the data of total maximum available electric braking force for the train, data of electric braking force required by the traction control unit provided on each power vehicle, and send the data of electric braking force to the traction control unit through the vehicle brake control unit, at the same time, receive data of electric braking force actually applied by the traction control unit which is sent by the vehicle brake control unit;

receive data of maximum available air braking force for single vehicle sent by the each vehicle brake control unit, and calculate data of total maximum available air braking force for the train according to the data of maximum available air braking force for single vehicle; and determine, according to the data of actually applied electric braking force which is sent by the traction control unit, whether a supplement of air braking force to the train is required, when the supplement of air braking force to the train is required, data of air braking force required by each vehicle brake control unit is calculated and is send to the corresponding vehicle brake control unit.

In some examples, the vehicle brake control unit is further configured to:

prestore vehicle information of the corresponding vehicle and send the information to the train brake control unit and the communication control unit, wherein the vehicle information at least comprises whether the vehicle corresponding to the vehicle brake control unit is the power vehicle;

make the vehicle brake control unit on the power vehicle receive the data of maximum available electric braking force for single vehicle and the actually applied electric braking force which are sent by the traction control unit provided on a same vehicle where the vehicle brake control is located, and receive the data of required electric braking force sent by the train brake control unit;

calculate the data of maximum available air braking force for single vehicle of each vehicle under current operating condition, and send it to the vehicle brake control unit;

receive and apply the data of required air braking force sent by the train brake control unit, and send data of the actually applied air braking force to the train brake control unit;

calculate and latch the weight information of each vehicle before the train starts, and send the weight information of each vehicle to the train brake control unit and the traction control unit;

detect the speed information of each vehicle, and send the speed information to the train brake control unit and the communication control unit.

In some examples, the vehicle brake control unit is further configured to detect a pressure of an air spring between the vehicle and a bogie, and convert the pressure to acquire the weight information of each vehicle.

In some examples, the vehicle brake control unit is further configured to:

receive the braking instruction from the communication control unit sent by the driver controller; the braking instruction at least comprises service braking and emergency braking;

when the braking instruction is the service braking, receive and apply the data of required air braking force sent by the train brake control unit, and send the data of actually applied air braking force to the train brake control unit; and when the braking instruction is the emergency braking, apply the emergency braking through an emergency braking safety circuit of the train.

In some examples, the vehicle brake control unit is further configured to:

when the vehicle corresponding to the vehicle brake control unit is the power vehicle and the vehicle brake control unit receives a sliding braking instruction from the driver controller sent by the communication control unit, cut off the traction control unit provided on a same vehicle where the vehicle brake control unit is located.

In some examples, vehicle brake control unit is configured to: perform fault diagnosis to the corresponding vehicle.

In some examples, the traction control unit is further configured to:

receive and latch the weight information sent by the vehicle brake control unit on a same vehicle where the traction control unit is located, and update the weight information each time when the train starts;

calculate the data of maximum available electric braking force for single vehicle of each vehicle under current operating condition, and send it to the vehicle brake control unit;

receive the data of required electric braking force which is calculated by the train brake control unit and sent by the vehicle brake control unit on a same vehicle where the traction control unit is located, apply the electric braking force according to the data of required electric braking force, and send the data of actually applied electric braking force to the vehicle brake control unit; and detect the speed information of each vehicle, and send the speed information to the vehicle brake control unit and the communication control unit.

In some examples, the traction control unit is further configured to:

receive the sliding braking instruction sent by the vehicle brake control unit provided on a same vehicle where the traction control unit is located, and perform an anti-skid protection operation after receiving the sliding braking instruction.

In some examples, the traction control unit is further configured to:

receive an electric braking force removing signal sent by the vehicle brake control unit provided on a same vehicle where the traction control unit is located, remove the electric braking force after receiving the electric braking force removing signal, and feed back a signal indicating the removal of the electric braking force to the vehicle brake control unit; at this point, the electric braking force applied by the traction control unit is zero.

In some examples, the communication control unit is further configured to:

monitor a handle state of the driver controller, and acquire a first braking instruction;

receive a second braking instruction sent by other brake systems except the driver controller in the train;

select the braking instruction to be executed among the first braking instruction and the second braking instruction, and send the braking instruction to the corresponding device.

In some examples, the communication control unit is further configured to receive speed information sent by the train brake control unit, the vehicle brake control unit and the traction control unit, and calculate the current actual speed of the train according to the speed information.

The present application also provides a train, which is provided with the above brake control system of a rail train.

The present application has the following beneficial effects.

The control system in the present application acquires the braking force to be applied according to the weight information and speed of the train, and respectively controls the electric braking force and the air braking force to be applied; the VBCU is provided on each vehicle to apply the air braking force, the TCU is provided on each power vehicle to apply the electric braking force, and the TBCU performs centralized control and management to the VBCU and the TCU, thereby realizing the flexible train formation according to different passenger flows and maintenance ways.

DETAILED DESCRIPTION

In order to make the technical solutions and advantages in embodiments of the present application clearer, the exemplary embodiments in the present application are further elaborated below in combination with the accompanying drawings. It is apparent that the described embodiments are only a part of the embodiments of the present application but not all. It is to be noted that the embodiments in the present application and the characteristics in the embodiments may be combined under the condition of no conflicts.

An embodiment provides a brake control system of a rail train, which is provided on a rail train. The rail train is in form of a regular train, including multiple vehicles. The vehicles include a power vehicle and a non-power vehicle.

Figure 1:
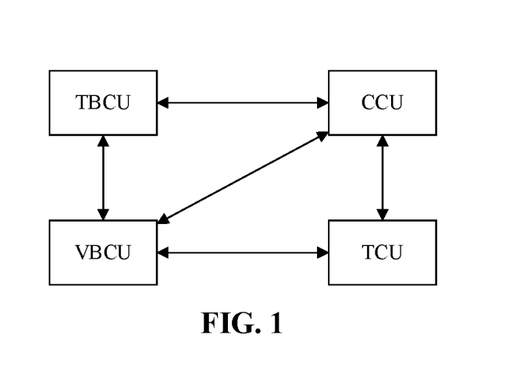
FIG. 1 is a principle diagram of a brake control system of a rail train according to an embodiment.

As illustrated in FIG. 1, the system includes a vehicle brake control unit, a train brake control unit, a traction control unit, and a communication control unit. each vehicle of a rail train is provided with the vehicle brake control unit. Each of the vehicles located at both ends of the rail train is provided with the train brake control unit and the communication control unit. Each of the power vehicles of the multiple vehicles is provided with the traction control unit. The vehicle brake control unit, the train brake control unit, the traction control unit and the communication control unit perform communication by means of gateways.

Specifically, the train brake control units (TBCU, Train Brake Control Unit) are provided on a head vehicle and a tail vehicle, take charge of controlling management of braking forces of the whole train, and are configured to calculate, according to braking information sent by the vehicle brake control unit and the traction control unit, data of air braking force and an electric braking force to be applied;

the vehicle brake control units (VBCU, Vehicle Brake Control Unit) are provided on each vehicle, take charge of controlling calculation of data of the braking force for the vehicle, and performing air braking on the train according to the data of the air braking force to be applied, which is sent by the TBCU;

the traction control units (TCU, Traction Control Unit) are provided on the power vehicles, take charge of controlling traction, and performing electric braking on the train according to the data of the electric braking force to be applied, which is sent by the TBCU;

the central control units (CCU, Central Control Unit) are provided on the head vehicle and the tail vehicle, and are connected to a driver controller, and are configured to receive a braking instruction sent from a driver controller, and send the braking instruction to a system where the instruction is executed.

Figure 2:
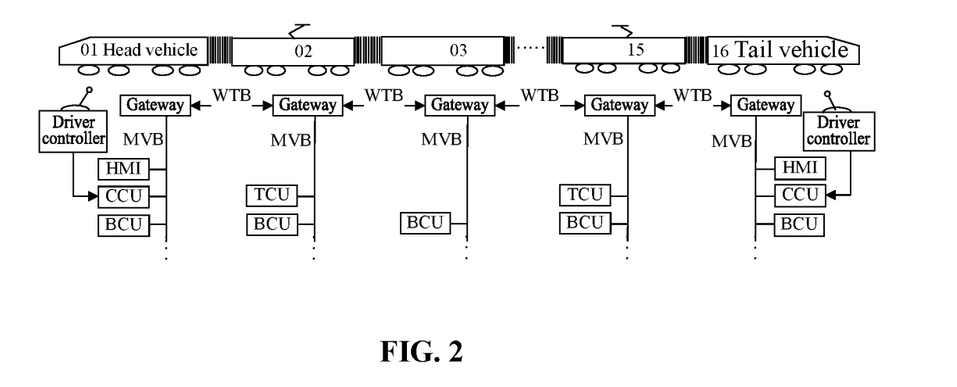
FIG. 2 is a schematic diagram of installation position and network topology of the brake control system of a rail train according to an embodiment.

As illustrated in FIG. 2, the network of the rail train in the embodiment uses a structure of Train Communication Network (TCN, Train Communication Network); the network in each vehicle is a Multifunction Vehicle Bus (MVB) network; network devices in all of the vehicles transmit control information through an MVB protocol. The network between the vehicles is a Wired Train Bus (WTB, Wired Train Bus) network. WTB data and MVB data are forwarded through the gateway provided in the vehicle. The braking instruction from the driver controller is sent to the gateway through the CCU.

Figure 3:
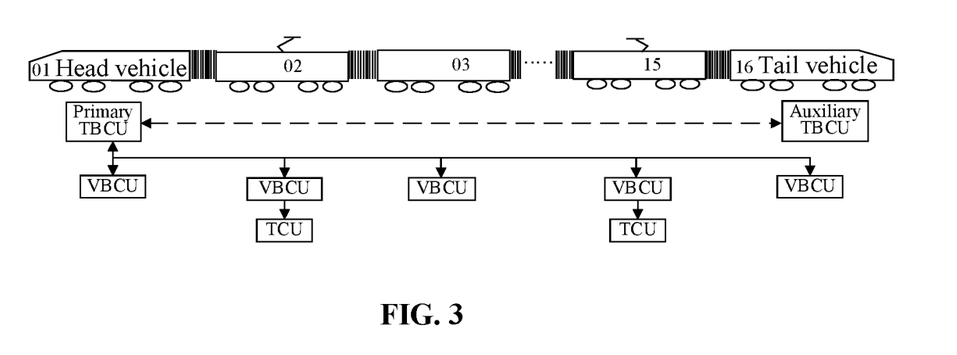
FIG. 3 is an information interaction diagram of the brake control system of a rail train according to an embodiment.

The brake control system in the embodiment uses a two-stage control structure. The TBCU and the VBCU form a master Brake Control Unit (BCU, Brake Control Unit). The TBCU takes charge of brake management of the whole train, and the VBCU takes charge of applying the braking of the respective vehicle. The head and tail vehicles are in a two-layer structure including the TBCU and the VBCU, performing the management of the braking force of the whole train and the brake control of the head and tail vehicles. The other vehicles only have the VBCU in charge of the brake control of themselves. As illustrated in FIG. 3, two TBCUs in head and tail vehicles are redundant and standby for each other. After the train is powered on, the TBCU in the vehicle where the driver is located is a primary TBCU, and the TBCU at the other side is an auxiliary TBCU. The two TBCUs performs communication of life signals with each other, and after the primary TBCU malfunctions, the auxiliary TBCU automatically becomes the primary TBCU to perform the brake control of the whole train.

The above is a network communication mode of the system described in the embodiment. These units described in the embodiment are elaborated below.

The train brake control unit (TBCU, Train Brake Control Unit) is configured to:

receive the braking instruction from the communication control unit sent by the driver controller, in which braking instruction at least includes a brake grade;

receive weight information M1 of each vehicle sent by each vehicle brake control unit, calculate and latch the total weight of the train according to the weight information of each vehicle, and update the total weight M2 of the train each time when the train starts;

receive and record speed information sent by each vehicle brake control unit, and send a record result to the communication control unit;

receive an actual speed of the train which is calculated by the communication control unit according to the record result;

acquire a current braking acceleration a of the train according to the brake grade and the actual speed of the train, and acquire the data of total braking force F=M2*a for the train according to the total weight M2 of the train and the current braking acceleration of the train;

receive data of maximum available electric braking force for single vehicle sent by the vehicle brake control unit provided on each power vehicle, and calculate data of total maximum available electric braking force $F_{EDMAX}$ for the train according to the data of maximum available electric braking force for single vehicle;

calculate, according to the data of total braking force F for the train and the data of total maximum available electric braking force $F_{EDMAX}$ for the train, data of electric braking force required by the traction control unit provided on each power vehicle, and send the data of electric braking force to the traction control unit through the vehicle brake control unit, at the same time, receive data of electric braking force actually applied by the traction control unit which is sent by the vehicle brake control unit;

receive data of maximum available air braking force for single vehicle sent by the each vehicle brake control unit, and calculate data of total maximum available air braking force $F_{EPMAX}$ for the train according to the data of maximum available air braking force for single vehicle; and determine, according to the data of actually applied electric braking force which is sent by the traction control unit, whether a supplement of air braking force to the train is required, when the supplement of air braking force to the train is required, data of air braking force required by each vehicle brake control unit is calculated and is send to the corresponding vehicle brake control unit.

The vehicle brake control unit (VBCU, Vehicle Brake Control Unit) is configured to:

prestore vehicle information of the corresponding vehicle and send the information to the train brake control unit and the communication control unit, wherein the vehicle information at least comprises whether the vehicle corresponding to the vehicle brake control unit is the power vehicle;

make the vehicle brake control unit on the power vehicle receive the data of maximum available electric braking force for single vehicle and the actually applied electric braking force which are sent by the traction control unit provided on a same vehicle where the vehicle brake control is located, and receive the data of required electric braking force sent by the train brake control unit;

calculate the data of maximum available air braking force for single vehicle of each vehicle under current operating condition, and send it to the vehicle brake control unit;

receive and apply the data of required air braking force sent by the train brake control unit, and send data of the actually applied air braking force to the train brake control unit;

detect a pressure of an air spring between the vehicle and a bogie before the train starts, convert the pressure to acquire the weight information M1 of each vehicle, and send the weight information M1 of each vehicle to the train brake control unit and the traction control unit;

detect the speed information of each vehicle, and send the speed information to the train brake control unit and the communication control unit;

receive the braking instruction from the communication control unit sent by the driver controller; the braking instruction at least comprises service braking and emergency braking; when the braking instruction is the service braking, receive and apply the data of required air braking force sent by the train brake control unit, and send the data of actually applied air braking force to the train brake control unit; and when the braking instruction is the emergency braking, apply the emergency braking through an emergency braking safety circuit of the train; and performing fault diagnosis on the corresponding vehicle.

The traction control unit (TCU, Traction Control Unit) is configured to:

receive and latch the weight information sent by the vehicle brake control unit on a same vehicle where the traction control unit is located, and update the weight information each time when the train starts;

calculate the data of maximum available electric braking force for single vehicle of each vehicle under current operating condition, and send it to the vehicle brake control unit;

receive the data of required electric braking force which is calculated by the train brake control unit and sent by the vehicle brake control unit on a same vehicle where the traction control unit is located, apply the electric braking force according to the data of required electric braking force, and send the data of actually applied electric braking force to the vehicle brake control unit;

detect the speed information of each vehicle, and send the speed information to the vehicle brake control unit and the communication control unit;

receive a sliding braking instruction sent by the vehicle brake control unit provided on a same vehicle where the traction control unit is located, and perform an anti-skid protection operation after receiving the sliding braking instruction;

receive an electric braking force removing signal sent by the vehicle brake control unit provided on a same vehicle where the traction control unit is located, remove the electric braking force after receiving the electric braking force removing signal, and feed back a signal indicating the removal of the electric braking force to the vehicle brake control unit; at this point, the electric braking force applied by the traction control unit is zero.

The central control unit (CCU, Central Control Unit) is configured to:

monitor a handle state of the driver controller, and acquire a first braking instruction;

receive a second braking instruction sent by other brake systems (namely the systems able to send the braking instruction, for example, an ATP system) except the driver controller in the train;

select, according to a preset rule, the braking instruction to be executed among the first braking instruction and the second braking instruction, and send the braking instruction to the corresponding device; for example, select the braking instruction with the maximum execution braking force or apply the braking according to a specific braking instruction source order; when both the driver controller and the ATP system have the braking instruction, apply preferentially the braking instruction of the ATP;

receive speed information sent by the train brake control unit, the vehicle brake control unit and the traction control unit, and calculate the current actual speed of the train according to the speed information.

Specifically, for the train with flexible formation, the brake system needs to acquire the following train parameters in the process of controlling the braking force:

1. the total number of vehicles in the formation of the train;

2. the position of each vehicle in the formation, which is used for differentiating it from other vehicles;

3. whether each vehicle is the power vehicle; and 4. the weight of the vehicle in consideration of a moment of inertia.

The gateway of each vehicle records the number of train and the number of vehicle through software. Take a four-digit code 0408 as an example, the first two digits represent the identification number of train, and the last two digits represent the identification number of vehicle. After the flexible marshaling of the train, information is sent through the gateway, and formation information of the train can be checked on a Human Machine Interface (HMI) in the vehicle of cab. At the same time, the CCU acquires the formation information of the train.

The TBCU acquires the formation information of the train, and checks the number of information of the VBCU. In case of inconsistency is detected, the TBCU makes fault alert; in case of consistency, the TBCU performs the brake control based on the number.

The train information corresponding to all identification numbers of the VBCU is collected in software of the VBCU. The train information comprises the characteristic of the air spring and the weight of the vehicle, and whether the vehicle is the power vehicle. Four BCU_Ident signals are input through an input board of the VBCU. The BCU detects the 0/1 state of the four signals to determine the identification number of the BCU, for example, 0001 represents the BCU No. 1, and 1011 represents the BCU No. 11. The BCU confirms the characteristic of the air spring and the weight of the vehicle, and whether the vehicle is the power vehicle, by confirming its own identification number and by the information of the BCUs collected in advance in the software of the BCU.

When the train is powered on to operate each time, the TBCU checks the formation information of the train. When finding that the formation information is wrong or inconsistent, the TBCU reports fault information.

Figure 4:
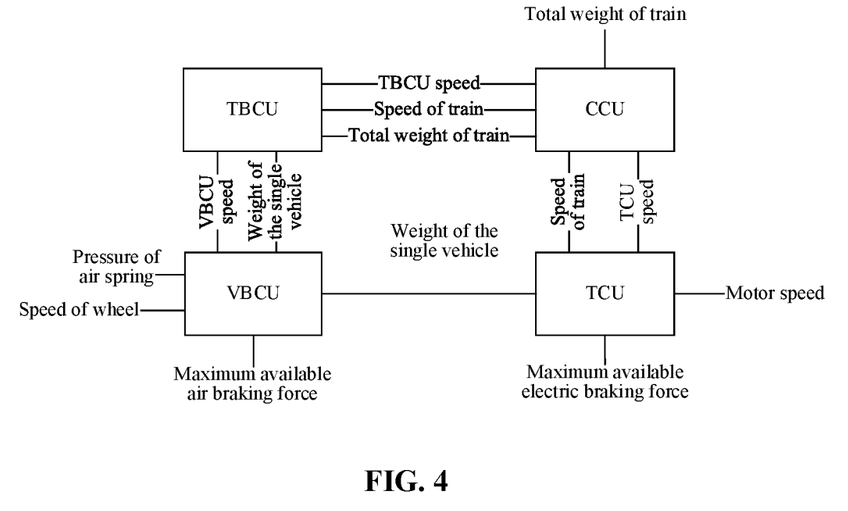
FIG. 4 is an information interaction diagram of the brake control system of a rail train when a train runs normally according to an embodiment.

FIG. 4 is an information interaction diagram of these units in the system of the embodiment when the train runs normally. The VBCU determines the weight of the corresponding vehicle according to the pressure of the air spring, and the sends the weight of the vehicle to the TBCU and the TCU. The TBCU calculates the total weight of the train. The VBCU sends wheel speed information to the TBCU. The TCU sends a speed of a motor to the CCU. The CCU determines the speed of the train according to a comprehensive judgment, and sends the speed of the train to the TBCU and the TCU. The VBCU determines the maximum available air braking force according to the speed and the weight of the train. The TCU determines the maximum available electric braking force according to the speed and the weight of the train.

Figure 5:
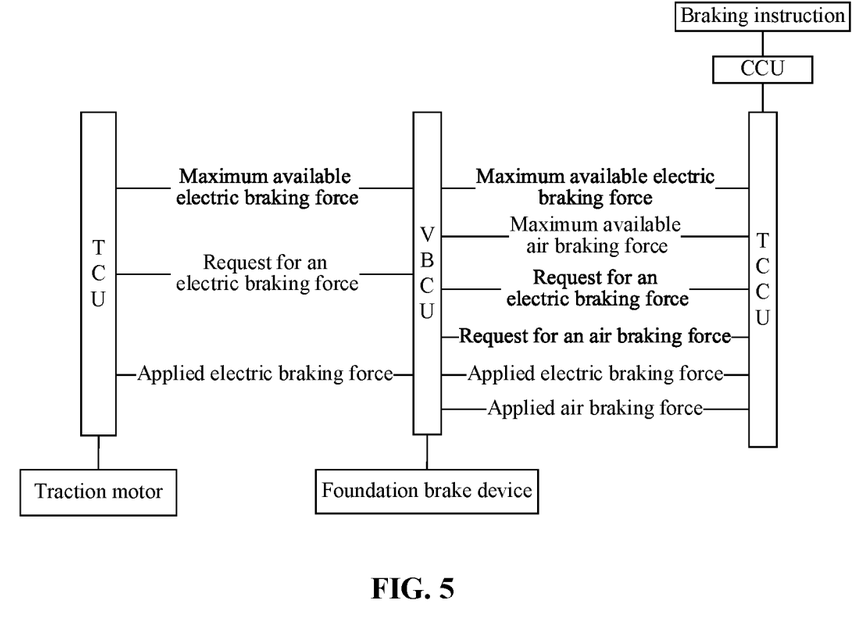
FIG. 5 is an information interaction diagram of the brake control system of a rail train during service braking of a train according to an embodiment.

FIG. 5 is an information interaction diagram of these units in the system of the embodiment when the train is in service braking. First, the CCU receives the braking instruction of performing the service braking sent by the driver controller, and the sends the braking instruction of performing the service braking to the TBCU; the TCU sends data of maximum available electric braking force to the TBCU through the VBCU; the VBCU sends data of maximum available air braking force to the TBCU; the TBCU determines a braking acceleration through the braking instruction and the speed of the train, determines data of total braking force according to the total weight of the train, and calculates the braking forces, including the air braking force and electric braking force to be applied, required by each VBCU and the corresponding TCU according to a preset braking force distribution policy. If the current vehicle is the power vehicle, the TBCU requires the VBCU for applying the electric braking force, and the VBCU forwards the data of electric braking force to be applied to the TCU of the vehicle; at the same time, the TBCU requires the VBCU for the air braking force. The TCU provided on the power vehicle receives the data of electric braking force to be applied, outputs the electric braking force through a traction motor, and feeds back data of actually applied electric braking force to the TBCU through the VBCU provided on a same vehicle where the TCU is located. The VBCU receives the data of air braking force to be applied, applies the air braking force through a foundation brake device, and sends data of applied air braking force to the TBCU.

The braking force distribution policies preset in the TBCU include an electric braking force preferential distribution mode, an equal distribution mode, and a snow removal mode The electric braking force preferential distribution mode is that the electric braking force is preferentially distributed, the insufficient part of the electric braking force is complemented by the air braking force, and the air braking of the trailer vehicle is preferentially complemented.

The equal distribution mode is that: the total braking force is equally distributed to all the vehicles; for the braking force to be applied to the power vehicle, the electric braking force on the power vehicle is preferentially used.

The snow removal mode is that: a small pressure value of a brake cylinder, for example, 50 kPa, is applied to the air braking, so that the foundation brake device generates a slight braking force, and generates heat to remove snow. In case of a high speed (above 100 km/h), a snow removal brake is applied intermittently and circularly, for example, a cycle period is applying the brake for 30 s after releasing the brake for 30 s. In case of a low speed (below 100 km/h), the snow removal brake is applied all the time.

In this process, a calculation process of the maximum available air braking force of the power vehicle is as follows:

the VBCU determines the maximum available total braking force $f_{tmax}$ of the power vehicle according to the speed and the weight of the vehicle;

the TCU sends the maximum available electric braking force $f_{edmax}$ and the applied electric braking force $f_{ed}$ to the VBCU;

when the maximum available electric braking force $f_{edmax}$ is valid, but the applied electric braking force $f_{ed}$ is invalid, the maximum available electric braking force $f_{epmax}$=the maximum available total braking force $f_{tmax}$–the maximum available electric braking force $f_{edmax}$;

when the maximum available electric braking force $f_{edmax}$ is valid, and the applied electric braking force $f_{ed}$ is valid, the maximum available electric braking force $f_{epmax}$=the maximum available total braking force $f_{tmax}$–the applied electric braking force $f_{ed}$.

Being valid means there are values sent, and the valid digit of data is 1; being invalid means there is no value sent, and the valid digit of data is 0.

Correspondingly, an embodiment also provides a train including the brake control system of a rail train. The VBCU is provided in each vehicle of a train, the TBCU is provided in the compartment of the power vehicle, and the TBCU and the CCU are provided in the head and tail vehicles of the train. The system acquires the braking force to be applied according to the weight information and the speed information of the train, and respectively controls the electric braking force and the air braking force to be applied. The VBCU is provided on each vehicle to apply the air braking force, the TCU is provided on each power vehicle to apply the electric braking force, and the TBCU performs centralized control and management to the VBCU and the TCU, thereby realizing the flexible train marshalling according to different passenger flows and maintenance ways.

It is apparent that those skilled in the art may make various modifications and changes to the present application without departing from departing from its spirit and scope. If these modifications and variations of the present application belong to the scope of the claims of the present application and its equivalent technology, the present application is intended to include these modifications and variations.

The invention claimed is:

1. A brake control system of a rail train comprising multiple vehicles, the multiple vehicles comprising power vehicles and non-power vehicles, wherein the system comprises a vehicle brake control unit, a train brake control unit, a traction control unit, and a communication control unit; each vehicle of a rail train is provided with the vehicle brake control unit; each of the vehicles located at both ends of the rail train is provided with the train brake control unit and the communication control unit; each of the power vehicles of the multiple vehicles is provided with the traction control unit; the vehicle brake control unit, the train brake control unit, the traction control unit and the communication control unit perform communication by means of gateways;
   the train brake control unit is configured to calculate, according to braking information sent by the vehicle brake control unit and the traction control unit, data of air braking force and an electric braking force to be applied;
   the vehicle brake control unit is configured to perform air braking on the train according to the data of the air braking force to be applied which is sent by the train brake control unit;
   the traction control unit is configured to perform electric braking on the train according to the data of the electric braking force to be applied which is sent by the train brake control unit; and
   the communication control unit is configured to receive a braking instruction from a driver controller, and send the braking instruction to a system where the instruction is executed.

2. The system of claim 1, wherein each vehicle is provided with a multifunction vehicle bus; each of the vehicle brake control unit, the train brake control unit, the traction control unit and the communication control unit is connected to the multifunction vehicle bus; the multifunction vehicle bus is connected to the gateway; the gateways between the multiple vehicles are connected to one another by means of a wired train bus.

3. The system of claim 2, wherein the train brake control unit comprises a primary unit and an auxiliary unit; the primary unit is the train brake control unit which is provided on the vehicle at one end of the rail train where the driver is located, and the auxiliary unit is the train brake control unit which is provided on the vehicle at the other end of the train; the primary unit and the auxiliary unit are connected to one another by means of the gateway; when the primary unit malfunctions, the auxiliary unit is upgraded to service as the primary unit.

4. The system of claim 3, wherein the train brake control unit is further configured to:
   receive the braking instruction from the communication control unit sent by the driver controller, wherein the braking instruction at least comprises a brake grade;
   receive weight information of each vehicle sent by each vehicle brake control unit, calculate and latch the total weight of the train according to the weight information of each vehicle, and update the total weight of the train each time when the train starts;
   receive and record speed information sent by each vehicle brake control unit, and send a record result to the communication control unit;
   receive an actual speed of the train which is calculated by the communication control unit according to the record result;
   acquire a current braking acceleration of the train according to the brake grade and the actual speed of the train, and acquire data of total braking force for the train according to the total weight of the train and the current braking acceleration of the train;
   receive data of maximum available electric braking force for single vehicle sent by the vehicle brake control unit provided on each power vehicle, and calculate data of total maximum available electric braking force for the train according to the data of maximum available electric braking force for single vehicle;
   calculate, according to the data of total braking force for the train and the data of total maximum available electric braking force for the train, data of electric braking force required by the traction control unit provided on each power vehicle, and send the data of electric braking force to the traction control unit through the vehicle brake control unit, at the same time, receive data of electric braking force actually applied by the traction control unit which is sent by the vehicle brake control unit;
   receive data of maximum available air braking force for single vehicle sent by the each vehicle brake control unit, and calculate data of total maximum available air braking force for the train according to the data of maximum available air braking force for single vehicle; and
   determine, according to the data of actually applied electric braking force which is sent by the traction control unit, whether a supplement of air braking force to the train is required, when the supplement of air braking force to the train is required, data of air braking force required by each vehicle brake control unit is calculated and is send to the corresponding vehicle brake control unit.

5. The system of claim 4, wherein the vehicle brake control unit is further configured to:
   prestore vehicle information of the corresponding vehicle and send the information to the train brake control unit and the communication control unit, wherein the vehicle information at least comprises whether the vehicle corresponding to the vehicle brake control unit is the power vehicle;
   make the vehicle brake control unit on the power vehicle receive the data of maximum available electric braking force for single vehicle and the actually applied electric braking force which are sent by the traction control unit provided on a same vehicle where the vehicle brake control is located, and receive the data of required electric braking force sent by the train brake control unit;
   calculate the data of maximum available air braking force for single vehicle of each vehicle under current operating condition, and send it to the vehicle brake control unit;
   receive and apply the data of required air braking force sent by the train brake control unit, and send data of the actually applied air braking force to the train brake control unit;
   calculate and latch the weight information of each vehicle before the train starts, and send the weight information of each vehicle to the train brake control unit and the traction control unit;
   detect the speed information of each vehicle, and send the speed information to the train brake control unit and the communication control unit.

6. The system of claim 5, wherein the vehicle brake control unit is further configured to detect a pressure of an air spring between the vehicle and a bogie, and convert the pressure to acquire the weight information of each vehicle.

7. The system of claim 6, wherein the vehicle brake control unit is further configured to:
receive the braking instruction from the communication control unit sent by the driver controller; the braking instruction at least comprises service braking and emergency braking;
when the braking instruction is the service braking, receive and apply the data of required air braking force sent by the train brake control unit, and send the data of actually applied air braking force to the train brake control unit; and
when the braking instruction is the emergency braking, apply the emergency braking through an emergency braking safety circuit of the train.

8. The system of claim 7, wherein the vehicle brake control unit is further configured to:
when the vehicle corresponding to the vehicle brake control unit is the power vehicle and the vehicle brake control unit receives a sliding braking instruction from the driver controller sent by the communication control unit, cut off the traction control unit provided on a same vehicle where the vehicle brake control unit is located.

9. The system of claim 8, wherein the vehicle brake control unit is configured to: perform fault diagnosis to the corresponding vehicle.

10. The system of claim 5, wherein the traction control unit is further configured to:
receive and latch the weight information sent by the vehicle brake control unit on a same vehicle where the traction control unit is located, and update the weight information each time when the train starts;
calculate the data of maximum available electric braking force for single vehicle of each vehicle under current operating condition, and send it to the vehicle brake control unit;
receive the data of required electric braking force which is calculated by the train brake control unit and sent by the vehicle brake control unit on a same vehicle where the traction control unit is located, apply the electric braking force according to the data of required electric braking force, and send the data of actually applied electric braking force to the vehicle brake control unit; and
detect the speed information of each vehicle, and send the speed information to the vehicle brake control unit and the communication control unit.

11. The system of claim 10, wherein the traction control unit is further configured to receive a sliding braking instruction sent by the vehicle brake control unit provided on a same vehicle where the traction control unit is located, and perform an anti-skid protection operation after receiving the sliding braking instruction.

12. The system of claim 11, wherein the traction control unit is further configured to:
receive an electric braking force removing signal sent by the vehicle brake control unit provided on a same vehicle where the traction control unit is located, remove the electric braking force after receiving the electric braking force removing signal, and feed back a signal indicating the removal of the electric braking force to the vehicle brake control unit; at this point, the electric braking force applied by the traction control unit is zero.

13. The system of claim 12, wherein the communication control unit is further configured to:
monitor a handle state of the driver controller, and acquire a first braking instruction;
receive a second braking instruction sent by other brake systems except the driver controller in the train;
select the braking instruction to be executed among the first braking instruction and the second braking instruction, and send the braking instruction to the corresponding device.

14. The system of claim 13, wherein the communication control unit is further configured to receive speed information sent by the train brake control unit, the vehicle brake control unit and the traction control unit, and calculate the current actual speed of the train according to the speed information.

15. The system of claim 5, wherein the traction control unit is further configured to:
receive and latch the weight information sent by the vehicle brake control unit on a same vehicle where the traction control unit is located, and update the weight information each time when the train starts;
calculate the data of maximum available electric braking force for single vehicle of each vehicle under current operating condition, and send it to the vehicle brake control unit;
receive the data of required electric braking force which is calculated by the train brake control unit and sent by the vehicle brake control unit on a same vehicle where the traction control unit is located, apply the electric braking force according to the data of required electric braking force, and send the data of actually applied electric braking force to the vehicle brake control unit; and
detect the speed information of each vehicle, and send the speed information to the vehicle brake control unit and the communication control unit.

16. A train, which is provided with a brake control system, the train comprising multiple vehicles, the multiple vehicles comprising power vehicles and non-power vehicles, wherein the system comprises a vehicle brake control unit, a train brake control unit, a traction control unit, and a communication control unit; each vehicle of a rail train is provided with the vehicle brake control unit; each of the vehicles located at both ends of the rail train is provided with the train brake control unit and the communication control unit; each of the power vehicles of the multiple vehicles is provided with the traction control unit; the vehicle brake control unit, the train brake control unit, the traction control unit and the communication control unit perform communication by means of gateways;
the train brake control unit is configured to calculate, according to braking information sent by the vehicle brake control unit and the traction control unit, data of air braking force and an electric braking force to be applied;
the vehicle brake control unit is configured to perform air braking on the train according to the data of the air braking force to be applied which is sent by the train brake control unit;
the traction control unit is configured to perform electric braking on the train according to the data of the electric braking force to be applied which is sent by the train brake control unit; and
the communication control unit is configured to receive a braking instruction from a driver controller, and send the braking instruction to a system where the instruction is executed.

17. The train of claim 16, wherein each vehicle is provided with a multifunction vehicle bus; each of the vehicle brake control unit, the train brake control unit, the traction control unit and the communication control unit is connected to the multifunction vehicle bus; the multifunction vehicle bus is connected to the gateway; the gateways between the multiple vehicles are connected to one another by means of a wired train bus.

18. The train of claim 17, wherein the train brake control unit comprises a primary unit and an auxiliary unit; the primary unit is the train brake control unit which is provided on the vehicle at one end of the rail train where the driver is located, and the auxiliary unit is the train brake control unit which is provided on the vehicle at the other end of the train; the primary unit and the auxiliary unit are connected to one another by means of the gateway; when the primary unit malfunctions, the auxiliary unit is upgraded to service as the primary unit.

19. The train of claim 18, wherein the train brake control unit is further configured to:
   receive the braking instruction from the communication control unit sent by the driver controller, wherein the braking instruction at least comprises a brake grade;
   receive weight information of each vehicle sent by each vehicle brake control unit, calculate and latch the total weight of the train according to the weight information of each vehicle, and update the total weight of the train each time when the train starts;
   receive and record speed information sent by each vehicle brake control unit, and send a record result to the communication control unit;
   receive an actual speed of the train which is calculated by the communication control unit according to the record result;
   acquire a current braking acceleration of the train according to the brake grade and the actual speed of the train, and acquire data of total braking force for the train according to the total weight of the train and the current braking acceleration of the train;
   receive data of maximum available electric braking force for single vehicle sent by the vehicle brake control unit provided on each power vehicle, and calculate data of total maximum available electric braking force for the train according to the data of maximum available electric braking force for single vehicle;
   calculate, according to the data of total braking force for the train and the data of total maximum available electric braking force for the train, data of electric braking force required by the traction control unit provided on each power vehicle, and send the data of electric braking force to the traction control unit through the vehicle brake control unit, at the same time, receive data of electric braking force actually applied by the traction control unit which is sent by the vehicle brake control unit;
   receive data of maximum available air braking force for single vehicle sent by the each vehicle brake control unit, and calculate data of total maximum available air braking force for the train according to the data of maximum available air braking force for single vehicle; and
   determine, according to the data of actually applied electric braking force which is sent by the traction control unit, whether a supplement of air braking force to the train is required, when the supplement of air braking force to the train is required, data of air braking force required by each vehicle brake control unit is calculated and is send to the corresponding vehicle brake control unit.

20. The train of claim 19, wherein the vehicle brake control unit is further configured to:
   prestore vehicle information of the corresponding vehicle and send the information to the train brake control unit and the communication control unit, wherein the vehicle information at least comprises whether the vehicle corresponding to the vehicle brake control unit is the power vehicle;
   make the vehicle brake control unit on the power vehicle receive the data of maximum available electric braking force for single vehicle and the actually applied electric braking force which are sent by the traction control unit provided on a same vehicle where the vehicle brake control is located, and receive the data of required electric braking force sent by the train brake control unit;
   calculate the data of maximum available air braking force for single vehicle of each vehicle under current operating condition, and send it to the vehicle brake control unit;
   receive and apply the data of required air braking force sent by the train brake control unit, and send data of the actually applied air braking force to the train brake control unit;
   calculate and latch the weight information of each vehicle before the train starts, and send the weight information of each vehicle to the train brake control unit and the traction control unit;
   detect the speed information of each vehicle, and send the speed information to the train brake control unit and the communication control unit.

* * * * *